United States Patent [19]
French

[11] Patent Number: 6,149,928
[45] Date of Patent: Nov. 21, 2000

[54] PROTECTION SYSTEM AGAINST SUBTERRANEAN TERMITES

[75] Inventor: John French, Moorabbin, Australia

[73] Assignee: Rhone-Poulenc Agrochimie, Lyons, France

[21] Appl. No.: 09/140,258

[22] Filed: Aug. 26, 1998

[30] Foreign Application Priority Data

Aug. 29, 1997 [EP] European Pat. Off. .............. 97115002

[51] Int. Cl.[7] ......................... A01N 25/00; A01N 43/40; A01N 43/56; A01M 1/20
[52] U.S. Cl. ......................... 424/405; 514/403; 514/341; 43/131; 43/132.1
[58] Field of Search ..................................... 514/341, 403; 424/405; 43/131, 132.1

[56] References Cited

U.S. PATENT DOCUMENTS

| | | | |
|---|---|---|---|
| 3,747,260 | 7/1973 | Lovness | 43/131 |
| 5,189,830 | 3/1993 | Montemurro | 43/121 |
| 5,749,168 | 5/1998 | Chrysanthis | 43/122 |

FOREIGN PATENT DOCUMENTS

| | | |
|---|---|---|
| 0385809A1 | 9/1990 | European Pat. Off. . |
| WO9323998 | 12/1993 | WIPO . |
| WO9632009 | 7/1996 | WIPO . |

*Primary Examiner*—Shelley A. Dodson
*Assistant Examiner*—Alton Pryor
*Attorney, Agent, or Firm*—Baker Botts LLC

[57] ABSTRACT

The present invention provides a protection system against subterranean termites including a hollow pipe in which termites are able to circulate, a container for containing bait and a branch connecting the hollow pipe to the container.

7 Claims, 3 Drawing Sheets

PROTECTION SYSTEM AGAINST SUBTERRANEAN TERMITES

BACKGROUND OF THE INVENTION

The invention is related to a technical system and to a method for controlling subterranean termites, and for the reduction or elimination of a population of subterranean termites. The term "termite" shall refer to "subterranean termite" hereafter in this document.

Many methods of eliminating termites, totally or partially, have already been proposed. Many insecticidal compounds have also been proposed for the same purpose. However, the termites remain a problem which is still difficult to control.

SUMMARY OF THE INVENTION

An object of the invention is to provide an easy, improved and efficient way or method to control termite populations.

Another object of the present invention is to provide an effective protection of buildings or housings or premises against termites.

Another object of the invention is to provide a simple and cheap method to control termites.

Another object of the instant invention is to provide a new and potent means to reduce the population of termites around a building.

It has been found that these objects can be met in whole or in part by means of the instant invention.

DETAILED DESCRIPTION OF THE INVENTION

Figure 1:
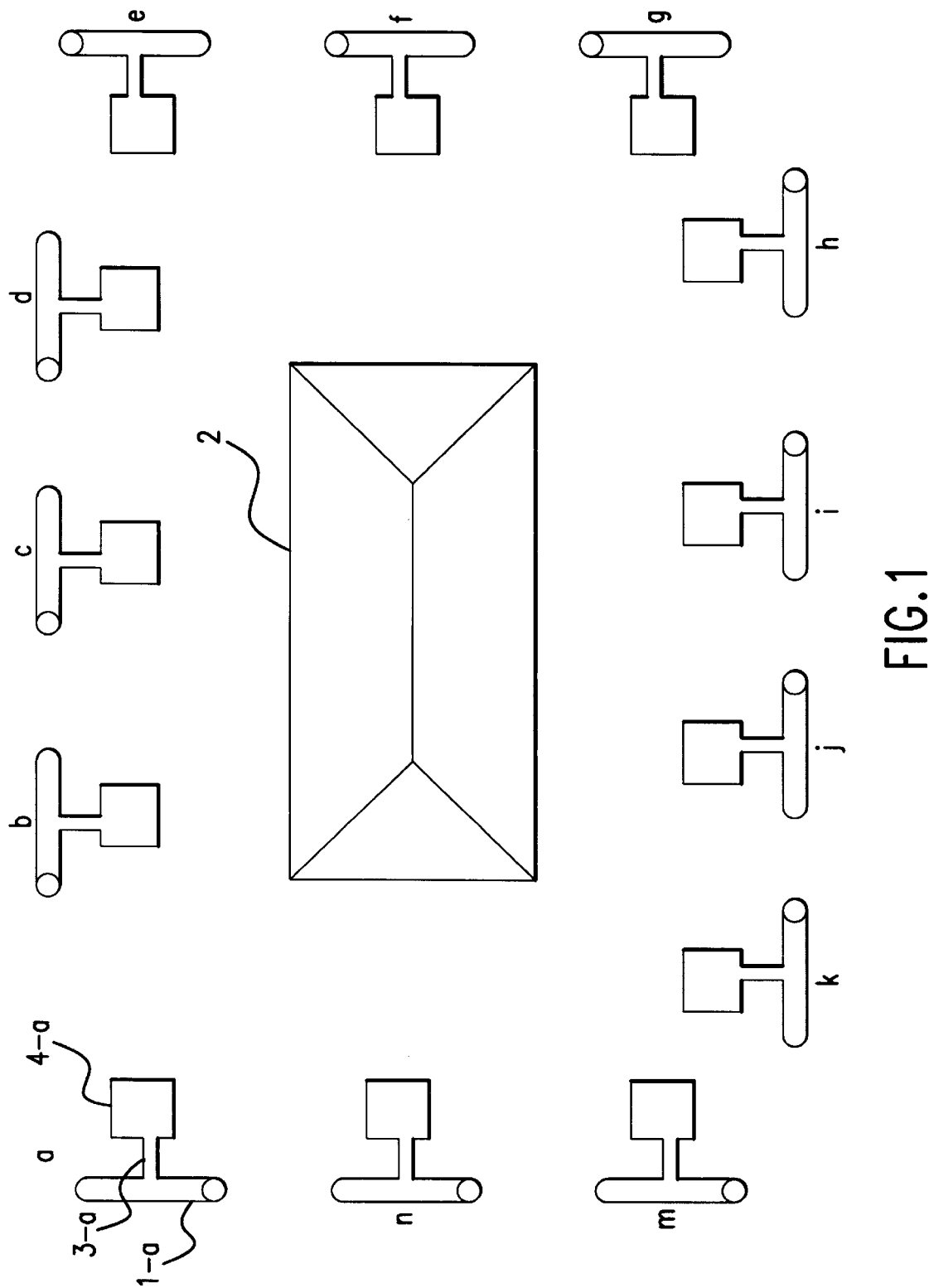
FIG. 1 illustrates a plurality of control systems according to the present invention arranged around a building.

The invention is thus related to a new system for the protection of buildings against termites. It comprises a set of partially controlling systems, each partially controlling system being able to control termites in a limited area close to the said building, the locations of each partially controlling system being such that the combination of all the limited areas provides a global control all around the said building, each partially controlling system (preferably a subterranean system) comprising a hollow pipe where termites are able to circulate (and are preferably attracted to circulate) and a branch connecting the said pipe to a container containing a bait, and optionally a poison for said termites, or an insecticide with delayed action for said termites.

According to a most preferred feature of the invention, the pipes of the partially controlling systems are formed together as a continuous pipe surrounding the building.

In the invention, the said pipes, either partial or combined into one, have generally a diameter wide enough to allow many termites to circulate easily therein and the said pipes are also pierced by holes which are large enough to permit termites to enter into the said pipe(s), the said holes being spread along the length of the pipe, preferably regularly.

A common manner to distribute the holes along the pipes is to have intervals between holes in the range from 2 cm to 25 cm, preferably from 6 cm to 20 cm.

According to another feature of the invention, the pipe(s) are made attractive to the termites by providing within the said pipes, an attracting material for them, such as corrugated cardboard, wood saw, wood chips or saw dust.

The invention relates also to a new system for the protection of buildings against termites comprising a hollow and continuous pipe for surrounding a building, the said pipe having a diameter wide enough to allow many termites to circulate easily therein and said pipe being also pierced by holes which are large enough to permit termites to enter into the pipe, the said holes being spread along the length of the pipe, preferably regularly.

Some various possible embodiments of the invention are described hereafter, which are either possible or preferred.

According to a first embodiment, the pipe(s) is/are buried in the soil deep enough so as not to be possibly seen from outside. It is (they are) buried preferably less than 30 cm deep, preferably in the range from 20 to 200 mm.

According to a preferred embodiment of the invention, the pipe is made of a material such as plastic. Its internal diameter is generally larger than 2 mm, preferably in the range of 3 to 25 mm outside diameter.

According to another preferred embodiment of the invention, the container containing a bait is a box containing (preferably full of) at least moisture or water, and preferably a material that attracts termites, such as wood, or wood particles, or wood saw or cardboard or corrugated cardboard. The bait may include other attractants such as pheromones.

The distance between the pipe and the building to be protected is not critical as long as the pipe makes a continuously effective barrier around the building. A distance comprising in the range from 0.5 m to 10 m is generally appropriate.

The invention will be more clearly understood from the following description, given by way of example only, with reference to the accompanying drawings, in which:

A control system includes a hollow pipe 1 connected to a container 4 via a branch 3. As illustrated in FIG. 1, a plurality of such control systems may be arranged around the periphery of a building 2.

Each hollow pipe 1-a to 1-n is arranged to allow termites to circulate within it. In particular, holes, not illustrated, may be provided along the length of the pipe to allow the termites to enter it. The whole system may be buried underground. However, for convenience, preferably each hollow pipe 1-a to 1-n is buried and each branch 3-a to 3-n links it to a respective container or bait box 4-a to 4-n above ground.

By providing a plurality of control systems around the periphery of the building, each protecting a local area, the entire periphery of the building 2 may be protected.

Figure 2:
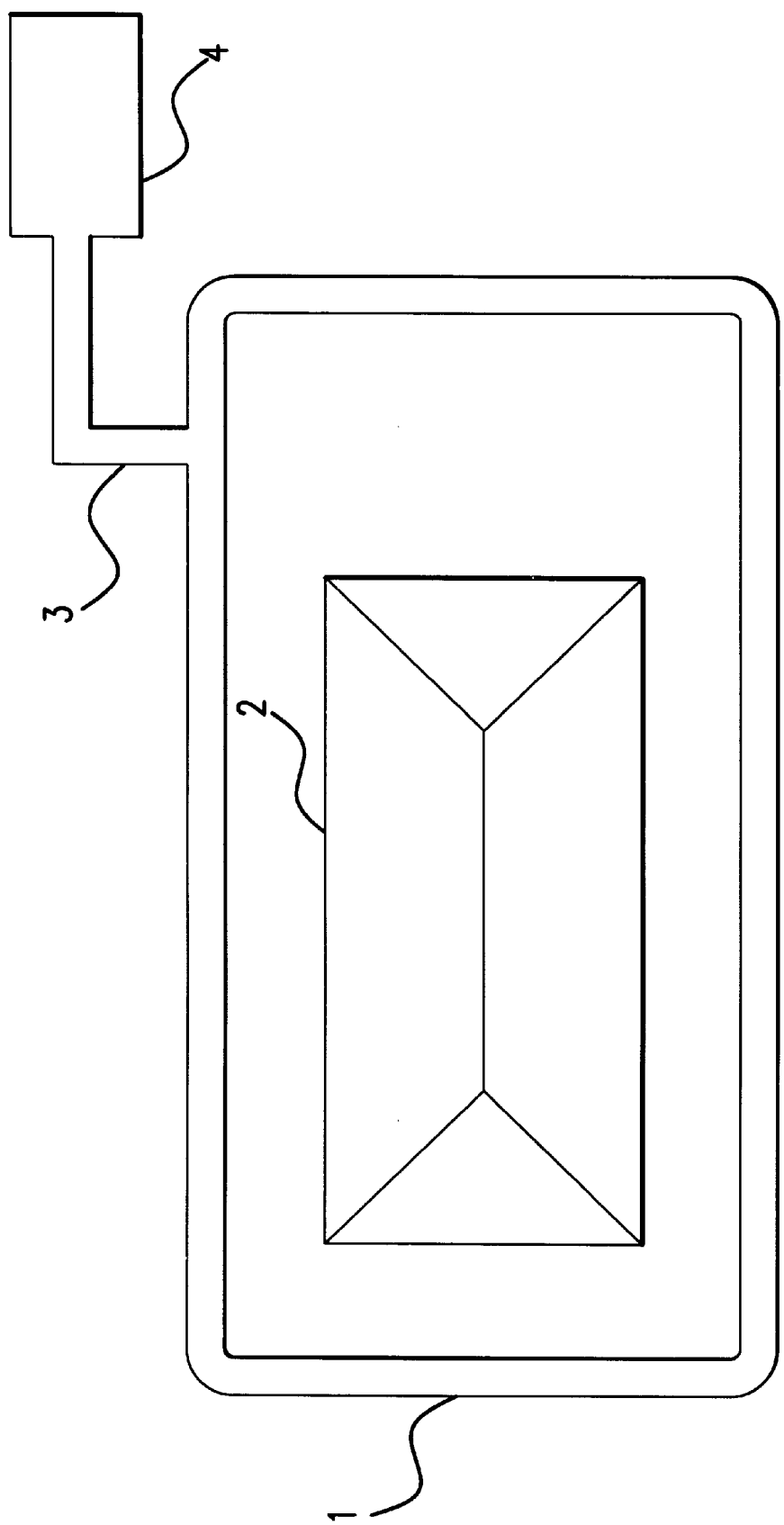
FIG. 2 illustrates a control system according to the present invention with a hollow pipe surrounding a building.

In the embodiment of FIG. 2, only a single control system is used to provide a system for complete protection of a building 2. In particular, the hollow pipe 1 is provided to extend around the entire periphery of the building 2.

Figure 3:
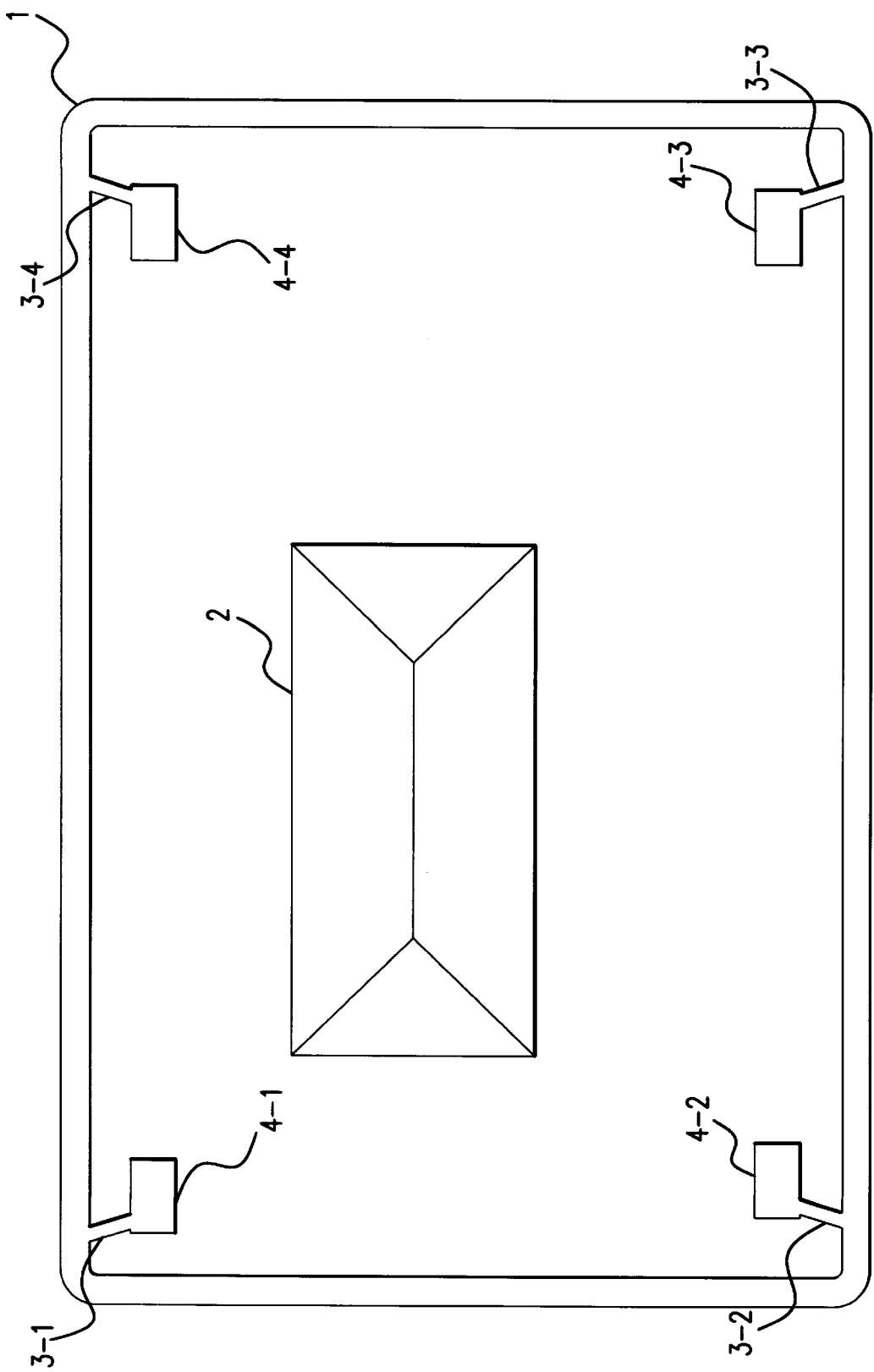
FIG. 3 illustrates four control systems according to the present invention having their pipes joined together to surround a building.

In the embodiment of FIG. 3, four control systems are provided with hollow pipes which link together to extend around the periphery of the building 2. Hence, a single hollow pipe 1 is linked via four branches 3-1 to 3-4 to four containers 4-1 to 4-4.

According to another preferred embodiment of the invention, the container containing a bait also contains an insecticide, which is preferably an insecticide having secondary killing properties and a delayed action. By secondary killing properties, it is meant that the insecticide is able not only to kill the insects which come in direct contact with it, but also to kill insects which come into social relations with the insects which have come into contact with the insecticide. The amount of insecticide in the said bait container should be large enough to be able to kill the whole amount of insects of the nest or harborage wherein the said insects are generally foraging. The amount further depends on the size of the termite nest or harborage and on the specific nature of the insecticide.

By insecticide having a delayed action, it is meant an insecticide having no knock-down effect, that is to say an insecticide which kills insects within a period of time greater than 3 minutes after they have taken a lethal dose, preferably greater than 30 minutes.

The bait container may be under the surface of the ground (soil immersion) or it may lay upon or above the ground. The branch then comes from the T-piece in the underground pipe to ground level to make the connection with the container.

Many insecticides with delayed action may be used in the invention. All insect growth regulators may be used. These compounds are generally acting on the molt. Compounds having insect growth regulating action include compounds killing the insects through a perturbation of the molt, especially the benzoylurea derivatives and all known insecticides having a benzoylurea group in their formula.

Another family of insecticides which is particularly appropriate to the invention is the 1-substituted-phenyl pyrazoles which have also other appropriate substituents on this pyrazole ring. The 1-arylpyrazoles which can be used according to the instant invention are preferably compounds of formula (I):

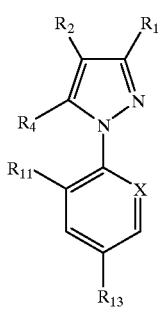

(I)

in which:
$R_1$ is CN or methyl or a halogen atom,
$R_2$ is $S(O)_n R_3$ or 4, 5-dicyanoimidazol 2-yl or haloalkyl,
$R_3$ is alkyl or haloalkyl;
$R_4$ represents a hydrogen or halogen atom or a member of a group consisting of $NR_5R_6$, $S(O)_m R_7$, $C(O)R_7$, $C(O)O—R_7$, alkyl, haloalkyl, $OR_8$ and $—N=C(R_9)(R_{10})$;
$R_5$ and $R_6$ independently represent the hydrogen atom or an alkyl, haloalkyl, C(O) alkyl, —C(O) $OR_7$ or $S(O)_r CF_3$ radical; or $R_5$ and $R_6$ can together form a divalent alkylene radical which can be interrupted by one or more heteroatoms, such as oxygen, nitrogen or sulfur;
$R_7$ represents an alkyl or haloalkyl radical;
$R_8$ represents an alkyl or haloalkyl radical or a hydrogen atom;
$R_9$ represents an alkyl radical or a hydrogen atom;
$R_{10}$ represents a phenyl or heteroaryl group which may optionally be unsubstituted or substituted by one or more halogen, OH, —O-alkyl, —S—alkyl, cyano or alkyl or combinations thereof;

$R_{11}$ and $R_{12}$ represent, independently of one another, a hydrogen or halogen atom, or CN or $NO_2$;
$R_{13}$ represents a halogen atom or a haloalkyl, haloalkoxy, $S(O)_q CF_3$ or $SF_5$ group;
X represents a trivalent nitrogen atom or a C—$R_{12}$ radical, the other three valences of the carbon atom forming part of the aromatic ring;
m, n, q, and r represent, independently of one another, an integer equal to 0, 1, or 2; and
provided that, when $R_1$ is methyl, then either $R_3$ is haloalkyl, $R_4$ is $NH_2$, $R_{11}$ is Cl, $R_{13}$ is $CF_3$ and X is N; or then $R_2$ is 4,5-dicyanoimidazol 2-yl, $R_4$ is Cl, $R_{11}$ is Cl, $R_{13}$ is $CF_3$, and X is=C—Cl.

The alkyl and alkoxy groups and moieties thereof of the formula (I) are preferably lower alkyl and alkoxy groups, that is, groups having one to six carbon atoms. The haloalkyl and haloalkoxy groups likewise preferably have one to four carbon atoms. The haloalkyl and haloalkoxy groups can bear one or more halogen atoms; preferred groups of this type include —$CF_3$ and —$OCF_3$. It shall be understood that the ring formed by the divalent alkylene radical represented by $R_5$ and $R_6$ and including the nitrogen atom to which $R_5$ and $R_6$ are attached is generally a 5, 6, or 7-membered ring. When $R_{10}$ is heteroaryl, it is preferably pyridyl, most preferably 2-pyridyl. It will be understood that the 1-arylpyrazoles of formula (I) include enatiomers and/or diastereomers thereof.

A preferred group of 1-arylpyrazoles for use in the present invention are those of formula (I) with one or more of the following features wherein:
$R_1$ is CN;
$R_4$ is —$NR_5R_6$;
$R_5$ and $R_6$ are independently selected from the hydrogen atom, alkyl, haloalkyl, C(O) alkyl, C(O)$OR_7$;
X is C—$R_{12}$; or
$R_{13}$ is selected from a halogen atom, haloalkyl, haloalkoxy, and —$SF_5$.

Another preferred group of 1-arylpyrazoles of formula (I) for use in the present invention is that wherein:
$R_1$ is CN;
$R_3$ is a haloalkyl radical;
$R_4$ is $NH_2$;
X is C—$R_{12}$;
$R_{11}$ and $R_{12}$ represent, independently of one another, a halogen atom; and
$R_{13}$ is a haloalkyl radical.

A most preferred compound is 5-amino-1-(2,6-dichloro 4-trifluoromethyl phenyl) 4-trifluoromethylsulfinyl-3-cyanopyrazole, hereafter designated as compound (A).

Compounds of formula (1) may be prepared according to known processes, for example as described in International Patent Publications WO 87/3781, 93/6089, and 94/21606 as well as in European Patent Applications 295117, 403300, 385809 or 679650, German Patent Publication 19511269 and U.S. Pat. Nos. 5,232,940 and 5,236,938 or other process according to the knowledge of a man skilled in the art of chemical synthesis, which is deemed to include Chemical Abstracts and the literature referred to therein. Compositions comprising the compounds of formula (I) may also be prepared according to the teaching of the same prior art or similar publications.

The protecting system according to the invention is advantageous because of its efficacy. An aspect of this efficacy is the ability to control numerous types of insects, especially subterranean termites, with a given amount of bait.

The following example illustrates the use of the invention in practice, but it by no means is meant that this example is deemed as limiting the invention to the particular described embodiments.

EXAMPLE 1

A plastic pipe of diameter 25 mm was laid to completely surround a house, the size of which was 15 m×20 m. Every 100 mm, the pipe had regular holes of diameter 3 mm.

The pipe was positioned five meters away from the house and 100 mm deep in the soil. It was connected by means of a branch to a box of size 200 mm×400 mm×400 mm. The pipe branch emerged from underneath and the box rested on the soil surface. The box contained 10 blocks of wood of 6 cm³ each, and moisture created by mean of 5 cm³ water poured upon the wood. In the same box was 0.1 g of fipronil spread as a liquid formulation upon the said blocks.

2 months after the installation of the pipe around the house, the box contained about 1200 dead termites.

I claim:

1. A control system for controlling termites comprising:
   a hollow pipe (1) where termites are able to circulate;
   a container (4) for containing bait; and
   a branch (3) connecting the hollow pipe (1) to the container (4) wherein said branch (3) permits termites to enter said container (4) wherein said container (4) contains an insecticide.

2. A system according to claim 1 wherein the insecticide is an insecticide with delayed action for said termite.

3. A system according to claim 1 wherein the hollow pipe (1) is made attractive to the termites by providing within the said pipe, an attractive material for them.

4. A system according to claim 1 wherein the insecticide is an insecticide having secondary killing properties.

5. A system according to claim 1 wherein the insecticide is an insecticide which is a compound of the formula (I):

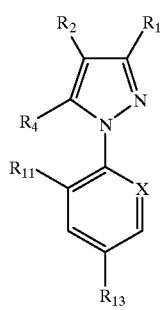

(I)

in which:

$R_1$ is CN or methyl or a halogen atom, $R_2$ is $S(O)_n R_3$ or 4, 5-dicyanoimidazol 2-yl or haloalkyl, $R_3$ is alkyl or haloalkyl;

$R_4$ represents a hydrogen or halogen atom or a member of a group consisting of $NR_5 R_6$, $S(O)_m R_7$, $C(O)R_7$, $C(O)O-R_7$, alkyl, haloalkyl, $OR_8$ and $-N=C(R_9)$ $(R_{10})$;

$R_5$ and $R_6$ independently represent the hydrogen atom or an alkyl, haloalkyl, C(O) alkyl, $-C(O) OR_7$ or $S(O)_r CF_3$ radical; or $R_5$ and $R_6$ can together form a divalent alkylene radical which can be interrupted by one or more heteroatoms, such as oxygen, nitrogen or sulfur;

$R_7$ represents an alkyl or haloalkyl radical;

$R_8$ represents an alkyl or haloalkyl radical or a hydrogen atom;

$R_9$ represents an alkyl radical or a hydrogen atom;

$R_{10}$ represents a phenyl or heteroaryl group which may optionally be unsubstituted or substituted by one or more halogen, OH, —O-alkyl, —S-alkyl, cyano or alkyl or combinations thereof;

$R_{11}$ and $R_{12}$ represent, independently of one another, a hydrogen or halogen atom, or CN or $NO_2$;

$R_{13}$ represents a halogen atom or a haloalkyl, haloalkoxy, $S(O)_q CF_3$ or $SF_5$ group;

X represents a trivalent nitrogen atom or a $C-R_{12}$ radical, the other three valences of the carbon atom forming part of the aromatic ring;

m, n, q, and r represent, independently of one another, an integer equal to 0, 1, or 2; and provided that, when $R_1$ is methyl, then either $R_3$ is haloalkyl, $R_4$ is $NH_2$, $R_{11}$ is Cl, $R_{13}$ is $CF_3$ and X is N; or then $R_2$ is 4,5-dicyanoimidazol 2-yl, $R_4$ is Cl, $R_{11}$ is Cl, $R_{13}$ is $CF_3$, and X is=C—Cl.

6. A protecting system according to claim 5 wherein:
   $R_1$ is CN
   $R_3$ is a haloalkyl radical;
   $R_4$ is NH2;
   X is C—$R_{12}$;
   $R_{11}$ and $R_{12}$ represent, independently of one another, a halogen atom; and
   $R_{13}$ is a haloalkyl radical.

7. A system according to claim 1 wherein the insecticide is an insecticide which is an insect growth regulator, comprising a benzoylurea group.

* * * * *